(12) United States Patent
Vilato et al.

(10) Patent No.: US 7,671,303 B2
(45) Date of Patent: Mar. 2, 2010

(54) GLASS-CERAMIC PLATE AND METHOD FOR MAKING SAME

(75) Inventors: Pablo Vilato, Paris (FR); Sergio Moreira, Chateau-Thierry (FR)

(73) Assignee: Eurokera S.N.C., Chateau-Thierry (FR)

( * ) Notice: Subject to any disclaimer, the term of this patent is extended or adjusted under 35 U.S.C. 154(b) by 0 days.

(21) Appl. No.: 10/509,890

(22) PCT Filed: Apr. 9, 2003

(86) PCT No.: PCT/FR03/01112

§ 371 (c)(1),
(2), (4) Date: Apr. 29, 2005

(87) PCT Pub. No.: WO03/084891

PCT Pub. Date: Oct. 16, 2003

(65) Prior Publication Data

US 2005/0224491 A1   Oct. 13, 2005

(30) Foreign Application Priority Data

Apr. 10, 2002   (FR) .................................. 02 04446

(51) Int. Cl.
*H05B 3/68* (2006.01)
*B32B 17/06* (2006.01)
*C03C 3/00* (2006.01)

(52) U.S. Cl. ........................ 219/443.1; 428/426; 501/11

(58) Field of Classification Search .............. 219/460.1, 219/461.1, 402.1, 405.1, 466.1, 467.1, 468.1, 219/469.2, 443.1; 428/426, 428, 429; 501/11, 501/14, 17, 20

See application file for complete search history.

(56) References Cited

U.S. PATENT DOCUMENTS

| | | | | | |
|---|---|---|---|---|---|
| 2,843,559 | A | * | 7/1958 | Kornbluth | .................... 524/588 |
| 2,866,720 | A | * | 12/1958 | Martin et al. | ................ 428/155 |
| 4,833,288 | A | * | 5/1989 | Poumey | ..................... 219/622 |
| 4,902,876 | A | * | 2/1990 | Mewissen | ................. 219/462.1 |
| 5,326,728 | A | * | 7/1994 | Boury et al. | .................... 501/17 |
| 5,691,254 | A | * | 11/1997 | Sakamoto et al. | ............. 501/17 |
| 5,866,239 | A | * | 2/1999 | Shimatani et al. | ........... 428/210 |
| 5,968,857 | A | * | 10/1999 | Pinckney | ...................... 501/10 |
| 6,124,223 | A | * | 9/2000 | Beall et al. | ..................... 501/4 |
| 6,369,365 | B1 | * | 4/2002 | Nass et al. | ................ 219/445.1 |
| 6,914,223 | B2 | * | 7/2005 | Krause et al. | ............ 219/460.1 |
| 7,009,150 | B2 | * | 3/2006 | Wennemann et al. | .. 219/452.11 |

FOREIGN PATENT DOCUMENTS

| | | |
|---|---|---|
| DE | 200 19 210 | 1/2001 |
| EP | 0 716 270 | 6/1996 |
| EP | 0 861 014 | 8/1998 |
| FR | 2 765 570 | 1/1999 |
| FR | 2 766 816 | 2/1999 |

* cited by examiner

*Primary Examiner*—Sang Y Paik
(74) *Attorney, Agent, or Firm*—Oblon, Spivak, McClelland, Maier & Neustadt, L.L.P.

(57) ABSTRACT

The present invention relates to a glass-ceramic plate intended especially for covering heating elements and provided on at least one face with at least one enamel patch and/or at least one coat of paint, with the exception, where appropriate, of functional and/or decorative areas.

The invention also relates to the process for manufacturing the plate and to the cooking appliance comprising said plate.

19 Claims, No Drawings

GLASS-CERAMIC PLATE AND METHOD FOR MAKING SAME

The present invention relates to a glass-ceramic plate intended especially for covering heating elements, in particular one intended to be used as a hob, the underlying heating elements associated with this hob being, for example, heat sources of the halogen or radiant or induction heating type.

It will be recalled that a glass-ceramic is derived from a glass, called a precursor glass, the specific chemical composition of which makes it possible to induce, by suitable heat treatments called ceramization (or ceramification) heat treatments, a controlled crystallization. This partly crystallized specific structure gives the glass-ceramic unique properties. During the ceramization treatments, the following phases are generally observed: a nucleation phase during which the nuclei on which the crystals will form coalesce and a crystallization phase during which the crystals form and then grow. The viscosity of the glass decreases during the initial heating, passes through a minimum just before crystallization and then increases owing to the effect of the crystallization. Nucleation takes place around 700° C. Ceramization to a transparent material takes place around 900° C., whereas ceramization to an opaque material takes place around 1100° C., opalization starting around 1000° C.

To be able to be used as a hob with underlying heating elements, a glass-ceramic plate must meet a number of criteria: in particular, it must have a transmission in the wavelengths of the visible range that is both low enough to at least partly mask the underlying heating elements and prevent the user from being dazzled by these same underlying heating elements when in operation and high enough so that, for the purpose of safety, the user can visually detect the heating elements when they are operating. It must also have a high transmission in wavelengths of the infrared range.

The first plates developed that met the criteria defined above were plates dark in color, in particular black. More recently, other plates have been developed with a clearer or lighter-colored (in particular white) appearance and having, for example, a haze of at least 50% (as described in patent FR 2 766 816). However, the choice of currently available plates meeting the aforementioned criteria remains limited, it being possible for a change in composition of the plates or in a parameter of their ceramization process (for example, the temperature) to make it difficult to obtain the desired properties. Furthermore, on certain plates, such as plates with a milky appearance obtained according to patent FR 2 766 816, obtaining a good compromise between the abovementioned criteria (such as detection of the heating elements in the operating state without dazzling or said elements being unattractively visible) is to the detriment of good visibility of optional displays (power or time, etc). placed beneath the plate.

It is an objective of the present invention therefore to develop plates exhibiting novel aspects in terms of harmonizing with more varied kitchen furniture and/or exhibiting more functional novel aspects, in particular more heterogeneous or differentiated aspects for better functionality by areas, for example for better visibility of the displays, without prejudicing the other desired criteria, these aspects and the optical characteristics remaining especially compatible with the use of the underlying heating elements, in particular with electrical induction heating elements.

This objective has been achieved with the plate according to the invention, this plate, intended especially to cover heating elements, being a glass-ceramic plate provided on at least one face with at least one enamel patch (or layer) and/or at least one coat (or layer) of paint. Advantageously, the surface covered by the enamel and/or the paint represents at least 40% of the surface of a face. Advantageously too, the term "face" is understood to mean one of the largest faces of the plate, that is to say the face turned toward the user in the operating position (upper or external face) or the face turned toward the heating elements in the operating position (lower or internal face), as opposed to the edge(s) (or thickness) of the plate.

Preferably, the coating (enamel patch and/or coat of paint) covers most of the surface of a face with the exception, where appropriate (optionally and if desired), functional areas (heating and/or display areas) and/or decorative areas ("negative" pattern(s), that is to say those formed by apertures left in the paint and/or enamel coating, the color of these patterns then generally being that conferred by the composition of the plate).

Until now, there has been a negative a priori to coat a large part of the surface of the plate, because of endurance problems (degradation of the paint by abrasion or heating) or esthetic problems (appearance of cracks in the enamel) that arose when testing the first black plates with a zero expansion coefficient that were developed. Depositing a composition on the plate therefore remained limited to small areas (decoration element, indication of the trademark or the surrounds of the heating areas).

Advantageously, the present invention has demonstrated that larger areas, especially the entire face of a plate, can be covered with an enamel patch and/or a coat of paint, in particular in the case of existing glass-ceramic plates having a non zero expansion coefficient and/or plates with a light-colored (or clearer) appearance (such as that described in patent FR 2 766 816).

The term "patch" is understood to mean a coat having at least one continuous part over at least one centimeter in at least one direction in the plane of the plate (in particular a part devoid of perforations, for the purpose of relaxing the stresses in the material in the case of thermal variation) and preferably over an area of at least 1 cm$^2$ in the plane of the plate. It should also be preferably understood that this coat is made in a single operation (or pass). Although this coat has in at least one place a continuity of at least 1 cm or 1 cm$^2$ as defined above, it may also have discontinuities so as, for example, to form a pattern or leave visible parts, and likewise the coat of paint, which is also preferably a patch, may have discontinuities.

It is also possible to coat the plate according to the invention with several coats of enamel and/or paint and/or to coat at least one part of each of the larger faces, the coating formed by all these coats on both the faces advantageously covering at least 40% of the surface of a face as indicated above (in other words, in the case in which a single face is covered, this coating covers at least 40% of said face, and in the case in which each of the larger sized faces is at least partly covered, the coating formed by the coats on these two faces projected onto a plane parallel to the plane of the plate occupies at least 40% of the surface of a face). The coats may be of identical or different compositions, they may be superposed or separate and are generally deposited on each face in question in as many operations as there are separate compositions. It is thus possible to envision forming several areas, each receiving at least one coat of enamel and/or paint of different composition depending on the area, the coating formed by the coats of all the areas covering at least 40% of one face or of the surface of one face (even if one or more of the coats may be of small extent), it thus being possible for the same plate to have various colors and it being possible for the various aforementioned areas also to form patterns.

Moreover, in the simplest embodiments comprising a single coat over most of one or each face, the coating thus forms, where appropriate combined with the color of the glass-ceramic, the bottom or the frame giving the general appearance (mainly in terms of coloration) of the plate.

The areas that are not covered (uncoated or in reserve) may advantageously form patterns, or marks, and allow better visibility of the luminous indicators or displays, for example having different colors, that are placed beneath the plate (the front panel—in the use position—of the plate may remain devoid of coating and, where appropriate, transparent when it houses, for example, the displays), which advantage could not be obtained, for example, with simply bulk-colored plates, or which could not be obtained without drawbacks by adding various independent parts (for example by adding a transparent panel carrying the displays to a translucent glass-ceramic plate, this solution causing lifetime problems of the assembly).

The area covered by the enamel and/or the paint in the present invention preferably represents at least 50% of the surface of a face and more particularly preferably at least 95% (or even 100%) of the surface of a face or of the surface of the said face less the area of the displays (and optionally less the heating areas).

The invention therefore provides a novel range of glass-ceramic plates, particularly colored glass-ceramic plates and plates with differentiated coloration and/or light transmission, allowing greater imagination and diversity in terms of decoration and harmonization with the furniture and/or having greater functionality. Owing to the choice of its constituent materials, it remains suitable for use as a hob without any risk of the plate degrading.

According to a first preferred embodiment of the invention, the plate according to the invention is a transparent or translucent glass-ceramic plate provided with at least one coat of paint on its lower face, with the exception, where appropriate, of decorative and/or functional areas such as the area for the displays or even also the heating areas when halogen or radiant electrical heating elements are used. Preferably, the plate is provided with a single coat of paint over most of its surface (with the exception, where appropriate, of functional and/or decorative areas), the paint being preferably white or colored (other than black).

The paint used to form the plate advantageously has a degradation temperature of greater than 350° C. (generally between 350° C. and 500° C.). Preferably, this is a paint based on silicone resin(s) and particularly preferably it comprises one or more silicone alkyd resins (that is to say one or more silicone resins modified by the incorporation of alkyd resin(s)). This paint may also contain pigments (for example it may contain $TiO_2$ in the case of a white paint), preferably pigments for enamels (in proportions not exceeding 50% by weight) depending on the desired coloration. Optionally, it is diluted for the purpose of applying it to the glass-ceramic in order to adjust its viscosity, the diluent or solvent (for example white spirit, toluene, etc) being, where appropriate, removed during the final baking of the paint.

The paint as selected, combined with the transparent glass-ceramic, allows the underlying elements to be masked sufficiently without, however, preventing them from being visually detected when in the operating state, and runs few risks of being impaired, in particular by the changes in temperature—the risks of being impaired by chemicals or by friction being further reduced when the coat of paint is on the inner face of the plate.

According to a second preferred embodiment of the invention, the plate according to the invention is a glass-ceramic plate provided with at least one enamel patch (with the possible exception of functional and/or decorative areas) on its upper face (enamel deposited on the lower face may weaken the plate). Advantageously, the thickness of the enamel patch (or of each enamel coat deposited) is less than 5 μm and preferably less than or equal to about 3.5 μm. Also preferably, the plate is coated with a single enamel patch, in a single pass, this patch covering most of the upper face of the plate (with the exception, where appropriate (optionally) of functional areas such as the area for the display and/or decorative components) and being particularly preferably an enamel having a color other than black or white.

The enamel may be chosen from existing enamel compositions and is generally formed (before application to the plate and baking) from a powder comprising a glass frit (that has to form the glassy matrix) and pigments (especially as colorants, these pigments possibly also forming part of the frit), the frit and the pigments being based on metal oxides, and from a medium or "vehicle" allowing the enamel to be applied and to adhere temporarily to a substrate. The glass frit is a vitrifiable blend of oxides chosen especially from the oxides commonly employed in frits for enamels, for example chosen from silicon oxide, zinc oxide, bismuth oxide, sodium oxide, boron oxide, lithium oxide, potassium oxide, calcium oxide, aluminum oxide, magnesium oxide, etc, or else chosen from barium oxide, strontium oxide, antimony oxide, etc. The content of pigment(s) in the frit(s)/pigment(s) combination of the enamel is generally between 10 and 50% by weight (with respect to the frit(s)/pigment(s) combination). The vehicle, chosen so as to ensure that the frit and pigment particles are properly in suspension and having to be consumed at the latest during baking of the enamel, may include solvents, diluents, oils, resins, etc.

The pigments for enamels (whether they form part of the paint and/or of the enamel used according to the invention) may be chosen from compounds containing metal oxides, such as chromium oxides, copper oxides, iron oxides, cobalt oxides and nickel oxides, or may be chosen from copper chromates, cobalt chromates, etc. They are used, where appropriate, in the paint and/or the enamel depending on the coloration that it is desired to obtain.

According to a third embodiment of the invention, the plate is coated both with at least one coat of enamel on its upper face and with at least one coat of paint on its lower face, the combination of the coats modifying the visibility through most of the plate, even if one of the coats may be of small extent (for example the enamel forming only a decoration).

Although the description applies to a glass-ceramic plate, this expression must be understood as including not only plates made of an actual glass-ceramic but also plates made of any other similar material resistant to high temperature and having a zero or almost zero expansion coefficient (for example less than $15 \times 10^{-7}$ $K^{-1}$). However, it is preferably a plate made of glass-ceramic itself. Also preferably, the glass-ceramic has an expansion coefficient close to zero, but not zero (for example greater than $4 \times 10^{-7}$ $K^{-1}$), in particular an expansion coefficient of less than $15 \times 10^{-7}$ $K^{-1}$, for example about $9 \times 10^{-7}$ $K^{-1}$, especially if the plate is coated with at least one enamel patch.

Also preferably, the coated glass-ceramic is transparent or translucent, in particular when the plate is coated with at least one coat of paint.

Finally, particularly preferably, the plate according to the invention is based on a glass-ceramic having a light (or clear) color (other than black or brown), this light-colored base providing in particular an additional brightness to the coated plates, for example a plate made of a glass-ceramic white or cream in color (or possibly bulk-colored with any other light tint). For example, the glass-ceramic may have the following calorimetric coordinates: an L* value of between 82 and 87, an a* value of between −3.0 and −0.5 and a b* value of between −4.0 and +4.0 (the (L*,a*,b*) coordinate system used in many fields forms in particular the subject of official recommendations—cf. Commission Internationale de l'Eclairage, Colorimetry—Recommandations Officielles [International Illumination Committee, Colorimetry—Official Recommendations], CIE [IIC] Publications No. 15-2, Vienna, 1986—the transmission measurements for determining these values generally being carried out under illuminant $D_{65}$).

According to one advantageous embodiment, the plate according to the invention is based on a glass-ceramic obtained by the ceramization of a glass having the following composition expressed in percentages by weight:

| | |
|---|---|
| $SiO_2$ | 63-70 |
| $Al_2O_3$ | 18-22 |
| $Li_2O$ | 2.5-4.5. |

Preferably, the glass-ceramic has a haze as defined in patent FR 2 766 816 (the haze being a measure of the level of light scattering and being defined as the ratio of the scattered transmission to the total transmission at a wavelength of 550 nm), in particular a haze of at least 50% and preferably less than 98%. Also preferably, if the plate has to include elements that should be seen through the plate, such as displays, the glass-ceramic is "under-ceramized" or ceramized at a low(er) temperature, that is to say ceramized using a known ceramization cycle in which the temperature of the ceramization hold is lowered by about ten or a few tens of degrees, particularly if the ceramization cycle for obtaining plates having a haze of at least 50% in accordance with patent FR 2 766 816, as described later, is used. The glass-ceramic thus ceramized at lower temperature allows the elements such as displays to be more clearly seen, the increase in transparency over the rest of the plate then being compensated for by the presence of the coat or coats of enamel and/or paint according to the invention, and preferably by the presence of at least one coat of paint covering the plate, preferably the lower face, with the exception of the spared area left for seeing the elements such as the displays.

In one embodiment in which the glass-ceramic has to have a milky white appearance, since ceramization at a lower temperature may slightly impair the color and the gloss (yellow-gray effect), applying a white paint to the lower face of the plate (except at the place of the displays) makes it possible to compensate for the effects of lower-temperature ceramization and to again obtain a plate with a white background and luminous appearance.

The glass-ceramic substrate used to form the plate according to the invention may be smooth and flat, or may have inclined parts or include (especially on the upper face) at least one raised area and/or at least one recessed area and/or at least one opening, for example in the case of a gas cooker, at least one opening intended to accommodate a gas/air burner. Provision may be made for this opening to be shaped and for it to be at the top of a local deformation of the plate, as described in patent FR 2 763 583. The lower face may be smooth or may have raised features and/or recesses; in general, it has small raised features or studs giving the plate better mechanical integrity.

Since the presence of studs may reduce the visibility of the displays, the plate according to the invention may also have on its lower face at least one coat of a resin (usually called an index resin) having the same optical index as that of the glass-ceramic so as to fill the hollows between the studs in those regions intended to face the displays.

The plate according to the invention may also be provided (or associated) with functional or decorative elements, that are generally added, such as a frame or one or more connectors and/or cables, one or more control elements, one or more displays, for example power displays (such as so-called "7-segment" displays), a touch-sensitive electronic control panel with digital displays, etc. In a preferred embodiment in which displays are provided under the plate, uncoated areas may be provided in the enamel and/or paint coat or coats at the places intended to face these displays, as mentioned above.

Preferably, the plate according to the invention is intended to be combined with underlying induction heating elements. Heat sources for cooking by induction heating are known and generally composed of a converter (or generator) connected to an inductor formed by a coil of conducting wires. The electromagnetic field created by the flow of a high-frequency current produced by the converter generates Foucault currents in the metal base of cooking vessels placed on the plate, allowing these cooking vessels to be rapidly heated. The temperature variations and temperature maxima undergone by the plate are therefore smaller than those observed with other heating elements, for example halogen or radiant elements, and consequently the plate according to the invention is particularly well suited to this method of heating, the thermal shocks undergone by the paint and/or enamel being smaller and less likely to damage it long term.

The plates according to the invention meet the requirements in terms of optical properties and safety and they exhibit good permeability to radiation from 10 to 50 kHz, good resistance to thermal shocks, etc. According to one advantageous characteristic, the plate according to the invention has a light transmission $T_L$ of between 5 and 40%.

The plate according to the invention may advantageously be mounted on the insulating support, inside which are placed the heating element or elements, such as inductors, without an intermediate complex for masking the inside of the appliance from the user's view.

The invention also relates to appliances (or devices) for cooking and/or for holding at high temperature, comprising at least one plate according to the invention (for example cookers and set-in hobs). The invention also encompasses both cooking appliances comprising a single plate and appliances comprising several plates, each of these plates being one with a single hot spot or with multiple hot spots. The term "hot spot" is understood to mean a cooking or baking place. The invention also relates to mixed cooking appliances in which a hob or hobs comprise several types of hot spots (gas, radiant, halogen or induction).

Furthermore, the invention is not limited to the manufacture of cooking plates for cookers or hobs, even though the problem forming the basis of the invention is defined in relation to this application. The plates manufactured according to the invention may also be glazing units for chimneys or other plates that have to be very insensitive to temperature variations.

The subject of the invention is also a process for manufacturing a plate according to the invention, in which at least one glass plate ceramization cycle is carried out, at least one of the faces of the plate being coated with at least one coat of enamel before the ceramization cycle and/or with at least one coat of paint as defined above after the ceramization cycle.

The ceramization cycle includes a crystallization hold of duration t at a temperature T, this cycle resulting in one or more β-quartz and/or β-spodumene crystalline phases depending on the type of glass-ceramic that it is desired to obtain (transparent, translucent or opaque). According to one particularly advantageous embodiment of the present invention, a glass composition is used that allows a white plate having a haze of at least 50% to be obtained and the ceramization cycle allowing said plate to be obtained by lowering, however, the temperature of the ceramization hold (reducing it by about 10 to 60° C.) is applied. To take an example, the ceramization is carried out as described in examples 2 to 4 of patent FR 2 766 816, but at a temperature of around 1020-1040° C. instead of a temperature of 1050-1070° C. This "underceramization" has the advantage of allowing better visibility through those parts of the plate that are not coated with paint or enamel (for example good visibility of the displays), the coloration and light transmission of the plate being maintained over the other parts with respect to the translucent plate described in the above patent because of the presence of the enamel and/or paint coat chosen depending on the desired color.

The paint and/or enamel are generally applied by screen printing. After application to the intended, flat or structured, face, the coat or coats are baked, either during the ceramization cycle for the enamel or after the ceramization cycle in the case of paint by subjecting the paint-coated glass-ceramic plate to a heat treatment at temperatures of between approximately 80 and 450° C. during a few tens of seconds to a few tens of minutes (generally for one minute to one hour). If an index resin is deposited on the plate in uncoated areas at the place of the displays, this resin is generally deposited after ceramization of the plate and, where appropriate, after the paint has been baked, and is preferably dried in the open air.

Further details and advantageous features will become apparent below from the description of an illustrative and non-limiting example of the invention.

This is based on a glass-ceramic formed from a glass having a composition similar or identical to that indicated in the examples of patent FR 2 766 816. This glass is melted at around 1650° C. in an amount such that a glass ribbon can be rolled, from which ribbon glass plates having final dimensions of 56.5 cm×56.5 cm×0.4 cm are cut.

These glass plates are ceramized on ceramic grids according to a ceramization cycle comprising the following steps:
 a) raising the temperature at 30-80 degrees/minute up to the nucleation range, generally located near the glass transformation range;
 b) passing through the nucleation range (670-800° C.) over some twenty minutes with a temperature hold of a few minutes;
 c) raising the temperature over 15 to 30 minutes to the ceramization hold temperature T of about 1030° C.;
 d) holding the ceramization hold temperature T for a time t of about 20 minutes; and
 e) rapidly cooling down to room temperature.

At the end of the ceramization cycle, the glass plate includes the β-spodumene crystalline phase.

The plate obtained is coated by screen printing on its lower face, with the exception of the place for the displays and optionally for the heating areas, with a coat of white paint comprising silicone alkyd resins, the paint being diluted with white spirit in order to adjust its viscosity. The paint is then baked in an oven at 140° C. for 75 seconds.

The plate according to the invention thus obtained has a milky white general appearance similar to that of the plates described in examples 2 to 4 of the patent FR 2 766 816, with the exception of the place for the displays and optionally for the heating areas with a more transparent white-gray appearance.

In a variant, it is possible to add 15% by weight of cobalt-based pigments to the paint used, so as to obtain a deep-blue colored plate (with the exception of the uncoated areas).

The plates according to the invention may especially be used advantageously for producing a novel range of hobs for cookers or cooktops.

The invention claimed is:

1. A glass-ceramic plate, comprising at least one enamel patch and/or at least one coat of paint on at least one face of the plate, wherein the plate comprises a glass-ceramic obtained from a glass comprising the following components expressed in percentages by weight:

| | |
|---|---|
| $SiO_2$ | 63-70 |
| $Al_2O_3$ | 18-22 |
| $Li_2O$ | 2.5-4.5 | and wherein the glass-ceramic has an L* value of between 82 and 87, an a* value of between −3.0 and −0.5 and a b* value of between −4.0 and +4.0, and wherein the glass-ceramic comprises at least one β-spodumene phase.

2. The glass-ceramic plate as claimed in claim 1, wherein at least 40% of the surface of the at least one face is covered with the at least one enamel patch and/or the at least one coat of paint, and if the plate comprises functional and/or decorative areas, said at least one enamel patch and/or said at least one coat of paint optionally do not cover the functional and/or decorative areas.

3. The glass-ceramic plate as claimed in claim 1, wherein the plate comprises a transparent or translucent glass-ceramic and the plate comprises the at least one coat of paint and the at least one coat of paint is on the lower face of the plate.

4. The glass-ceramic plate as claimed in claim 1, wherein the plate comprises the at least one coat of paint and the paint has a degradation temperature greater than 350° C. and the paint optionally comprises pigments.

5. The glass-ceramic plate as claimed in claim 1, wherein the plate comprises the at least one coat of paint and the paint comprises at least one silicone resin.

6. The glass-ceramic plate as claimed in claim 1, wherein the plate comprises the at least one enamel patch and the enamel patch is on the upper face of the plate.

7. The glass-ceramic plate as claimed in claim 1, wherein the plate comprises a glass-ceramic having an expansion coefficient of less than $15 \times 10^{-7}$ $K^{-1}$.

8. The glass-ceramic plate Glass plate according to claim 1, wherein the plate comprises a transparent or translucent glass-ceramic.

9. The glass-ceramic plate as claimed in claim 1, wherein the plate comprises a glass-ceramic having a haze of at least 50%.

10. The glass-ceramic plate as claimed in claim 1, wherein the plate comprises an underceramized glass-ceramic.

11. The glass-ceramic plate as claimed in claim 1, wherein the at least one face of the plate comprises regions not coated with said at least one enamel patch and/or at least one coat of paint.

12. The glass-ceramic plate as claimed in claim 11, wherein the lower face of the plate comprises at least one coat of an index resin in the regions intended to face at least one display.

13. The glass-ceramic plate as claimed in claim 1, wherein the plate is combined with underlying induction heating elements.

14. A process for manufacturing the plate as claimed in claim 1, comprising:
- carrying out at least one glass plate ceramization cycle,
- coating at least one of the faces of the plate with at least one enamel patch before the ceramization cycle and/or with at least one coat of paint after the ceramization cycle.

15. The process as claimed in claim 14, wherein a glass composition capable of producing a plate having a haze of at least 50% is used and utilized in the ceramization cycle by lowering the ceramization hold temperature by 10 to 60° C.

16. The process as claimed in claim 14, further comprising:
- baking the plate by heating the plate at temperatures of between 80 and 450° C. for a few tens of seconds to a few tens of minutes,
- wherein said baking is carried out during the ceramization if the plate comprises the at least one enamel or after the ceramization if the plate comprises the at least one paint, and
- optionally depositing an index resin after ceramization and baking of the paint on the plate in the uncoated areas wherein at least one display is locate, and
- optionally drying the resin in the open air.

17. A device for cooking and/or holding at high temperature, comprising the glass-ceramic plate as claimed in claim 1, and a material selected from the group consisting of one or more heating elements, one or more air burners, one or more gas burners, one or more induction heating means and combinations thereof.

18. The device as claimed in claim 17, wherein the plate is mounted on an insulating support without an intermediate complex intended for masking the inside of the device from the view of a user.

19. The glass-ceramic plate as claimed in claim 6, wherein the at least one enamel patch is a single colored enamel patch, the thickness of the enamel patch is less than 5 µm, and if the plate comprises functional and/or decorative areas, the single colored enamel patch optionally does not cover the functional and/or decorative areas.

* * * * *